United States Patent [19]

Takemoto

[11] 4,029,584

[45] June 14, 1977

[54] PNEUMATIC SLUDGE DISCHARGING SYSTEM

[76] Inventor: Tadao Takemoto, No. 2-2, 3-chome, Shimezu, Itami, Japan

[22] Filed: Oct. 26, 1976

[21] Appl. No.: 735,408

[30] Foreign Application Priority Data

Mar. 23, 1976 Japan .............................. 51-33020

[52] U.S. Cl. ........................... 210/532 R; 210/537; 137/171; 137/590
[51] Int. Cl.² ...................................... B01D 17/00
[58] Field of Search ........... 210/513, 532 R, 532 S, 210/533, 537; 137/171, 590

[56] References Cited

UNITED STATES PATENTS

| 1,056,928 | 3/1913 | Morris | 210/532 R |
| 1,069,048 | 7/1913 | Wetherbee | 210/532 R |
| 2,490,319 | 12/1949 | Palsgrove | 137/590 |
| 2,946,443 | 7/1960 | Schmidt | 210/513 |

Primary Examiner—Frank A. Spear, Jr.
Assistant Examiner—Ernest B. Therkorn
Attorney, Agent, or Firm—Wenderoth, Lind & Ponack

[57] ABSTRACT

A system for discharging sludge out of a settling tank for sewage disposal. It includes a sludge collecting pipe installed at the tank bottom and provided with branch pipes extending downwardly. A compressed air supply pipe and a sludge discharge pipe are connected to the sludge collecting pipe.

1 Claim, 1 Drawing Figure

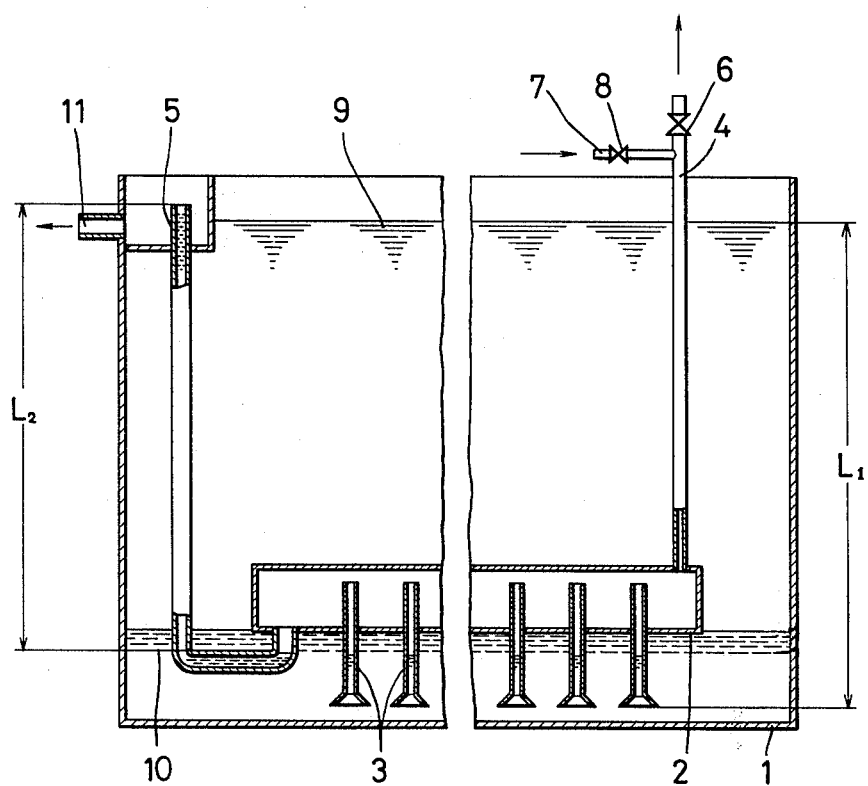

PNEUMATIC SLUDGE DISCHARGING SYSTEM

The present invention relates to an improved sludge discharging system for use in a settling tank.

A conventional method for discharging sludge from a settling tank for sewage disposal or the like is to install one or more perforated pipes horizontally at the bottom of the tank, one end of said pipes being introduced outside the tank and provided with a discharge valve which is opened intermittently to discharge the sludge out of the tank through the perforations in the pipes by action of the pressure of liquid in the tank. But, this method had a shortcoming that sludge was discharged properly through the perforations adjacent to the discharge valve, but hardly through the ones remote therefrom.

An object of the present invention is to provide an improved sludge discharging system which can collect and discharge sludge uniformly through all the perforations in the sludge collecting pipe. Referring to the drawing, a sludge collecting pipe 2 is installed adjacent to the bottom of a settling tank 1. The reference numbers 9 and 10 designate supernatant liquid and sludge that has settled, respectively. The pipe 2 is provided with a plurality of vertically extending branch pipes 3 arranged with suitable spacings, said branch pipes having their upper end projecting into the collecting pipe 2 as far as near the top wall thereof. The collecting pipe 2 is closed at both ends thereof.

An air supply pipe 4 is connected to the collecting pipe 2 adjacent to one end thereof to extend upwardly therefrom until it comes beyond the top of the settling tank 1. Adjacent to the other end thereof is also connected a sludge discharge pipe 5 which extends first downwardly therefrom, then horizontally, and upwardly until its top end comes slightly above the level of the liquid being treated in the tank. The horizontal section of the sludge discharge pipe 5 is disposed above the lower end of the branch pipes 3.

The liquid level is kept constant by some known method. The length, $L_1$, from the bottom of the branch pipes 3 to the liquid surface is adapted to be larger than the length, $L_2$, from the horizontal section of the sludge discharge pipe 5 to the top thereof. At the top of the air supply pipe 4 is provided an exhaust valve 6 below which is connected a compressed air supply pipe 7 provided with a valve 8.

In operation, with the exhaust valve 6 closed, compressed air is supplied from a compressor or the like into the sludge collecting pipe 2 through the air supply pipe 4 at such a pressure that equilibrium is established between the air pressure and the pressure or head of the liquid being treated. The FIGURE illustrates the condition when such an equilbrium is reached. The exhaust valve 6 is then opened to communicate the air supply pipe 4 with the open air. Only the atmospheric pressure now acts uniformly on the top of all the branch pipes 3. Since they are still under the uniform pressure of the liquid from under, the sludge 10 flows into the collecting pipe 2 through all the branch pipes 3 at substantially the same flow rate so that the collecting pipe 2 is filled with sludge and a new equilibrium is reached.

Then the exhaust valve 6 is closed and the pressure at which compressed air is supplied is increased. This causes the sludge in the collecting pipe 2 to be discharged from the discharge port 11 through the sludge discharge pipe 5. Since the branch pipes 3 have their upper end projecting high into the collecting pipe 2, sludge cannot be discharged therethrough. Also, since $L_1$ is larger than $L_2$, air will not flow through the branch pipes 3 into the settling tank 1. Just before or after excess air starts to bubble out of the top of the discharge pipe 5, the valve 8 is closed. This restores such an equilibrium as illustrated in the FIGURE.

It will be understood from the foregoing that sludge can be efficiently discharged out of the settling tank 1 by repeating the sludge collecting and discharging steps and that sludge is collected at substantially the same flow rate through all the branch pipes. The frequency of sludge discharge depends on the amount of sludge settled. A plurality of the sludge discharging systems may be installed in the tank 1 instead of only one if the latter is large.

While a preferred embodiment has been described, variations thereto will occur to those skilled in the art within the scope of the present invention.

What is claimed is:

1. A system for discharging sludge from a settling tank, said system comprising:
    a sludge collecting pipe mounted in the tank in a horizontal position and having its opposite ends closed,
    a plurality of branch pipes mounted on said sludge collecting pipe to extend downwardly therefrom for collecting sludge therethrough into said sludge collecting pipe,
    said branch pipes having their top end projecting into said sludge collecting pipe near the top wall thereof,
    an air supply pipe connected to said sludge collecting pipe to extend upwardly therefrom until it comes above the surface of a liquid to be treated in the tank,
    said air supply pipe being open to the outside air at top end thereof through an exhaust valve and being connected to a source of compressed air at a position below said exhaust valve, and
    a sludge discharge pipe connected to said sludge collecting pipe to extend downwardly and then upwardly until its top end comes slightly above the surface of the liquid to be treated,
    said sludge discharge pipe having its lowermost portion disposed above the bottom end of said branch pipes, whereby the supply of compressed air causes the sludge to be discharged out of said sludge collecting pipe through said sludge discharge pipe.

* * * * *